(12) United States Patent
Braun et al.

(10) Patent No.: US 9,884,933 B2
(45) Date of Patent: Feb. 6, 2018

(54) COMB COPOLYMER AND PROCESS FOR THE PREPARATION THEREOF

(71) Applicant: SOCIETE D'EXPLOITATION DE PRODUITS POUR LES INDUSTRIES CHIMIQUES SEPPIC, Paris (FR)

(72) Inventors: Olivier Braun, St Just St Rambert (FR); Paul Mallo, Croissy-sur-Seine (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 0 days.

(21) Appl. No.: 15/338,588

(22) Filed: Oct. 31, 2016

(65) Prior Publication Data

US 2017/0044292 A1    Feb. 16, 2017

Related U.S. Application Data

(62) Division of application No. 14/405,513, filed as application No. PCT/FR2013/051204 on May 29, 2013, now abandoned.

(30) Foreign Application Priority Data

Jun. 15, 2012  (FR) ...................................... 12 55617

(51) Int. Cl.
 *C08F 273/00*   (2006.01)
 *C08F 293/00*   (2006.01)

(52) U.S. Cl.
 CPC ........ *C08F 273/00* (2013.01); *C08F 293/005* (2013.01)

(58) Field of Classification Search
 CPC .. C08F 273/00; C08F 293/005; C08F 265/10; C08F 20/54; C08F 20/56; C08F 220/54; C08F 220/56; C08F 22/38; C08F 22/385; C08F 222/38; C08F 222/385
 See application file for complete search history.

(56) References Cited

U.S. PATENT DOCUMENTS

| | | |
|---|---|---|
| 5,422,176 A | 6/1995 | Schuler et al. |
| 6,187,887 B1 | 2/2001 | Albrecht et al. |
| 6,830,670 B1 | 12/2004 | Viovy et al. |
| 2002/0198328 A1 | 12/2002 | L'Alloret |
| 2008/0234391 A1 | 9/2008 | McCormick et al. |
| 2015/0299365 A1 | 10/2015 | Mallo et al. |
| 2015/0315319 A1 | 11/2015 | Mallo et al. |
| 2015/0322192 A1* | 11/2015 | Braun ................... C08F 273/00 525/329.4 |

FOREIGN PATENT DOCUMENTS

| | | |
|---|---|---|
| EP | 0562344 | 9/1993 |
| EP | 0936228 | 8/1999 |
| FR | 2886301 | 12/2006 |
| WO | 00/40958 | 7/2000 |
| WO | 2007/000535 | 1/2007 |
| WO | WO 2013/186455 A1 * | 12/2013 |

OTHER PUBLICATIONS

Liu et al: "A study of thermoassociative gelation of aqueous cationic poly(N-isopropyl acrylamide) graft copolymer solutions", Polymer. Elsevier Science Publishers B.V. GB. vol. 50. No. 6. Mar. 6, 2009 (Mar. 6, 2009) pp. 1456-1462. XP025992737, ISSN: 0032-3861. 001: 10.1016/J.POLYMER.2009.01.035 [retrieved on Jan. 23, 2009] abstract only.
International Search Report PCT/FR2013/051204, dated Oct. 29, 2013.
FR Search Report, dated Mar. 2013, Application No. FR 1255617.

* cited by examiner

*Primary Examiner* — Roberto Rabago
(74) *Attorney, Agent, or Firm* — Young & Thompson

(57) ABSTRACT

A comb copolymer having a backbone of 2-acrylamido-2-methylpropanesulfonic acid, with grafted lateral side segments of poly(N-alkylacrylamide) or poly(N,N-dialkylacrylamide), is provided. A process for the preparation of the comb copolymer includes reacting a compound of formula (II) with a compound of formula (III) in a (tert-butanol)-water mixture, to obtain a poly(N-alkylacrylamide) or poly (N,N-dialkylacrylamide) telomere of formula (I); reacting in tert-butanol the telomer of formula (I) with an acid chloride of formula (IV) to obtain a solution of the macromonomer of formula (V); and copolymerizing in tert-butanol the macromonomer of formula (V) with an ammonium salt of 2-acrylamido-2-methylpropanesulfonic acid.

4 Claims, No Drawings

COMB COPOLYMER AND PROCESS FOR THE PREPARATION THEREOF

The present patent application has as subject matter a novel process for the preparation of water-soluble grafted copolymers.

Heat-thickening polymers are polymers, the viscosity of which varies considerably as a function of the temperature. They are characterized in particular by a "critical" temperature, above which the viscosity of their aqueous solution very markedly increases, generally by a factor of several tens.

International application WO 00/40958 describes a process for the preparation of copolymers of acrylamide and of poly(N-isopropylacrylamide) which includes the following successive stages:
(a) the synthesis of an N-isopropylacrylamide (NIPAM) telomer by radical polymerization;
(b) isolation of the telomer obtained, $(PNIPAM)_x$-$NH_2$, by precipitation from ether, filtration and then drying;
(c) the reaction in methylene chloride of $(PNIPAM)_x$-$NH_2$ with a large excess acrylic acid in the presence of cyclohexylcarbodiimide to result in the poly(NIPAM) macromonomer carrying an acryloyl functional group at the $(PNIPAM)_x$ chain end;
(d) the isolation of the macromonomer obtained by precipitation from ether, filtration and then drying;
(e) the copolymerization of the macromonomer obtained with acrylamide (AM) or dimethylacrylamide (DMA) in water, in order to obtain the grafted copolymers comprising a $(PNIPAM)_x$ segment, AM-g-$(PNIPAM)_x$ or DMA-g-$(PNIPAM)_x$;
(f) the purification by precipitation from water for DMA/$(PNIPAM)_x$ or from acetone for AM/$(PNIPAM)_x$, followed by ultrafiltration.

The international application published under the number WO 2007/000535 discloses a process for the preparation of grafted polymers, while limiting as much as can be done the use of organic solvents, and more particularly a process for the preparation of a comb copolymer, the backbone of which is of the acrylamide, acrylic acid, acryloylaminoethanol or dimethylacrylamide type, to which poly(N-alkylacrylamide) or poly(N,N-dialkylacrylamide) side segments are grafted, comprising the following successive stages:
(a) the preparation of a poly(N-alkylacrylamide) or poly (N,N-dialkylacrylamide) telomer, of formula (I):

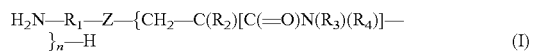  (I)

in which n represents an integer greater than or equal to 2 and less than or equal to 100, Z represents a functional group capable of acting as radical transfer agent, $R_1$ represents a divalent radical comprising from 1 to 4 carbon atoms, $R_2$ represents a hydrogen atom or a methyl radical, $R_3$ represents a hydrogen atom or a linear or branched alkyl radical comprising from 1 to 4 carbon atoms and $R_4$, which is identical to or different from $R_3$, represents a linear or branched alkyl radical comprising from 1 to 4 carbon atoms, by reaction in water of a compound of formula (II):

$$CH_2=C(R_2)—C(=O)N(R_3)(R_4) \quad (II)$$

in which $R_2$, $R_3$ and $R_4$ are as defined above, with a chain-limiting compound of formula (III):

$$—R_1—NH_2 \quad (III)$$

in which Z represents a functional group capable of acting as radical transfer agent, in a (II)/(III) molar ratio of less than or equal to n and greater than or equal to n/10, in the presence of a polymerization initiator;
(b) the isolation of the telomer of formula (I) obtained in stage (a);
(c) the reaction in water of the telomer of formula (I) obtained in stage (b) with the acid chloride of formula (IV):

$$CH_2=C(R_5)—C(=O)—Cl \quad (IV)$$

in which $R_5$ represents a hydrogen atom or a methyl radical and in a (IV)/(III) molar ratio of less than or equal to 10 and greater than or equal to 1, while maintaining the pH of the reaction medium at a value of between 6 and 13 and preferably between 7 and 8, in order to obtain a macromonomer of formula (V):

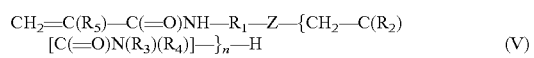  (V)

(d) the isolation of the macromonomer of formula (V) obtained in stage (c);
(e) the copolymerization in water of the macromonomer of formula (V) isolated in stage (d) with a monomer chosen from acrylamide, acrylic acid, acryloylaminoethanol or dimethylacrylamide and, if desired;
(f) the purification of the comb copolymer obtained.

In point of fact, while the process thus disclosed operates perfectly when the main backbone is composed of a sequence of neutral monomers, it is not the same when it is desired to replace these neutral monomers with ionic monomers, such as acrylic acid or 2-acrylamido-2-methylpropanesulfonic acid (ATBS). This is because a salting out phenomenon occurs, which results in the polymerization of the macromonomer intended to form the pendant chains, such as the poly(N-isopropylacrylamide) macromonomer. The inventors have thus attempted to develop a process which does not exhibit the disadvantage set out above.

For this reason, according to a first aspect, a subject matter of the invention is a process for the preparation of a comb copolymer, the backbone of which is of the 2-acrylamido-2-methylpropanesulfonic acid (ATBS) type, to which poly (N-alkylacrylamide) or poly(N,N-dialkylacrylamide) side segments are grafted, characterized in that it comprises the following successive stages:
a stage (a) of reaction of a compound of formula (II):

$$CH_2=C(R_2)—C(=O)—N(R_3)(R_4) \quad (II)$$

in which $R_2$ represents a hydrogen atom or a methyl group, $R_3$ represents a hydrogen atom or a linear or branched alkyl radical comprising from 1 to 4 carbon atoms and $R_4$, which is identical to or different from $R_3$, represents a linear or branched alkyl radical comprising from 1 to 4 carbon atoms, with a chain-limiting compound of formula (III):

$$Z—R_1—NH_2 \quad (III)$$

in which $R_1$ represents a divalent radical comprising from 1 to 4 carbon atoms and Z represents a functional group capable of acting as radical transfer agent, in the presence of a polymerization initiator, in a tert-butanol/water mixture, in order to obtain a poly(N-alkylacrylamide) or poly(N,N-dialkylacrylamide) telomer of formula (I):

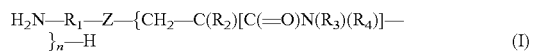  (I)

in which n represents an integer greater than or equal to 2 and less than or equal to 100 and Z represents a functional group capable of acting as radical transfer agent; optionally
a stage (b) of isolation and/or of drying of said telomer of formula (I) obtained in stage (a);

a stage (c) of reaction in tert-butanol of the telomer of formula (I) obtained in stage (a) or optionally in stage (b) with an acid chloride of formula (IV):

$$CH_2=C(R_5)-C(=O)-Cl \quad (IV)$$

in which $R_5$ represents a hydrogen atom or a methyl radical, in a (IV)/(III) molar ratio of less than or equal to 10 and greater than or equal to 1, while maintaining the pH of the reaction medium at a value of between 8 and 10, in order to obtain a solution of the macromonomer of formula (V):

$$CH_2=C(R_5)-C(=O)NH-R_1-Z-\{CH_2-C(R_2)[C(=O)N(R_3)(R_4)]-\}_n-H \quad (V)$$

optionally a stage (d) of isolation and/or of drying of said macromonomer of formula (V) obtained in stage (c);

a stage (e) of copolymerization in tert-butanol of the macromonomer of formula (V) resulting from stage (c) or from stage (d) with the ammonium salt of 2-acrylamido-2-methylpropanesulfonic acid and, if desired;

a stage (f) of purification of the comb copolymer obtained in stage (e).

tert-Butanol/water mixture denotes, in the process as defined above, a mixture for which the proportion by volume of water is less than or equal to 50%.

According to a specific aspect of the process as defined above, in the formula (II), $R_2$ and $R_3$ each represent a hydrogen atom and $R_4$ represents an isopropyl radical.

Another subject matter of the invention is a comb copolymer, the backbone of which is of the 2-acrylamido-2-methylpropanesulfonic acid type, to which poly(N-alkyl(meth)acrylamide) or poly(N,N-dialkyl(meth)acrylamide) side segments are grafted, said side segments being chosen from the following side segments:

poly(N-methylmethacrylamide) side segments,
poly(N-ethylmethacrylamide) side segments,
poly(N-propylmethacrylamide) side segments,
poly(N-isopropylmethacrylamide) side segments,
poly[N-(2-hydroxyethyl)methacrylamide] side segments,
poly(N,N-dimethylmethacrylamide) side segments,
poly(N,N-diethylmethacrylamide) side segments,
poly(N-methylacrylamide) side segments,
poly(N-ethylacrylamide) side segments,
poly(N-propylacrylamide) side segments,
poly(N-isopropylacrylamide) side segments,
poly[N-(2-hydroxyethyl) acrylamide] side segments,
poly(N,N-dimethylacrylamide) side segments,
poly(N,N-diethylacrylamide) side segments, and more particularly a comb copolymer as defined above in which said side segments are chosen from the following side segments:

poly(N-isopropylacrylamide) side segments,
poly[N-(2-hydroxyethyl)acrylamide] side segments,
poly(N,N-dimethylacrylamide) side segments and
poly(N,N-diethylacrylamide) side segments.

The following example illustrates the invention without, however, limiting it. It demonstrates that it is possible to prepare comb polymers without an acrylamide backbone comprising side segments of N-alkylacrylamide type which are heat-thickening.

Preparation of a Comb Copolymer Comprising a Backbone of ATBS Type, to which Poly(N-Isopropylacrylamide) Side Segments are Grafted ATBS-g-NIPAM (1) Preparation of a poly(N-isopropyl acrylamide) telomer 435 g of N-isopropylacrylamide (NIPAM) are dissolved in a tert-butanol/water mixture (50/50 by volume) in a thermostatically controlled reactor until 1000 g are reached, and stirring is carried out under nitrogen sparging for approximately one and a half hours. 2-Aminoethanethiol hydrochloride (AET.HCl) is subsequently added in a predetermined NIPAM/AET.HCl molar ratio of approximately 48/1. The polymerization is initiated with dilauroyl peroxide by bringing the temperature to 60° C. and then the reaction medium is left stirring and under nitrogen sparging for a further 2 hours. A white and pasty final reaction mixture is obtained.

(2) Preparation of the Macromonomer

A solution of potassium hydroxide (0.16 N) in tert-butanol and acryloyl chloride are added to the reaction medium obtained in stage (1) maintained at a temperature of 10° C., while maintaining the pH in the vicinity of 9. At the end of the reaction, the content of NIPAM macromonomer is 17.8% by weight and the water content is 10.7% by weight.

(3) Synthesis of the Copolymer 61.8 g of the reaction medium obtained in stage (2) are diluted in 170 g of tert-butanol in the reactor thermostatically controlled at 15° C. 77 g of the ammonium salt of 2-acrylamido-2-methylpropanesulfonic acid and then 0.44 g of trimethylolpropane triacrylate are added thereto. The polymerization is initiated with dilauroyl peroxide and the medium is left stirring for four hours while maintaining the temperature at 60° C.

The polymer which precipitated during the polymerization is recovered by filtration. After drying, the desired copolymer is obtained in the powder form.

It is found that a 1% by weight solution of the polymer in water is slightly viscous. After heating above 80° C., there is formation of a gel, which is characteristic of a heat-thickening polymer.

The invention claimed is:

1. A method for the preparation of a comb copolymer, the comb copolymer comprising a backbone comprising 2-acrylamido-2-methylpropanesulfonic acid, with grafted poly(N-alkylacrylamide) or poly(N,N-dialkylacrylamide) side segments, the method comprising the following successive stages:

(a) reaction of a compound of formula (II):

$$CH_2=C(R_2)-C(=O)-N(R_3)(R_4) \quad (II)$$

in which $R_2$ represents a hydrogen atom or a methyl group, $R_3$ represents a hydrogen atom or a linear or branched alkyl radical comprising from 1 to 4 carbon atoms, and $R_4$, which is identical to or different from $R_3$, represents a linear or branched alkyl radical comprising from 1 to 4 carbon atoms, with a chain-limiting compound of formula (III):

$$Z-R_1-NH_2 \quad (III)$$

in which $R_1$ represents a divalent radical comprising from 1 to 4 carbon atoms and Z represents a functional group capable of acting as radical transfer agent, in the presence of a polymerization initiator, in a tert-butanol/water mixture, to obtain a poly(N-alkylacrylamide) or poly(N,N-dialkylacrylamide) telomer of formula (I):

$$H_2N-R_1-Z-\{CH_2-C(R_2)[C(=O)N(R_3)(R_4)]-\}_n\text{'}H \quad (I)$$

in which n represents an integer greater than or equal to 2 and less than or equal to 100 and Z represents a functional group capable of acting as radical transfer agent; optionally
(b) isolation and/or of drying of said telomer of formula (I) obtained in stage (a);
(c) reaction in tert-butanol of the telomer of formula (I) obtained in stage (a) or optionally in stage (b) with an acid chloride of formula (IV):

$$CH_2=C(R_5)-C(=O)-Cl \qquad (IV)$$

in which $R_5$ represents a hydrogen atom or a methyl radical, in a (IV)/(III) molar ratio of 1 to 10 inclusive, while maintaining the pH of the reaction medium at a value of between 8 and 10, to obtain a solution of a macromonomer of formula (V):

$$CH_2=C(R_5)-C(=O)NH-R_1-Z-\{CH_2-C(R_2)[C(=O)N(R_3)(R_4)]-\}_n-H \qquad (V),$$

optionally
(d) isolation and/or of drying of said macromonomer of formula (V) obtained in stage (c);
(e) copolymerization in tert-butanol of the macromonomer of formula (V) resulting from stage (c) or from stage (d) with an ammonium salt of 2-acrylamido-2-methylpropanesulfonic acid, and optionally
(f) purification of the comb copolymer obtained in stage (e).

2. The method as defined in claim 1, wherein in the formula (II), $R_2$ and $R_3$ each represent a hydrogen atom and $R_4$ represents an isopropyl radical.

3. The method as defined in claim 1, wherein said side segments are selected from the group consisting of
poly(N-methylmethacrylamide) side segments,
poly(N-ethylmethacrylamide) side segments,
poly(N-propylmethacrylamide) side segments,
poly(N-isopropylmethacrylamide) side segments,
poly[N-(2-hydroxyethyl)methacrylamide] side segments,
poly(N,N-dimethylmethacrylamide) side segments,
poly(N,N-diethylmethacrylamide) side segments,
poly(N-methylacrylamide) side segments,
poly(N-ethylacrylamide) side segments,
poly(N-propylacrylamide) side segments,
poly(N-isopropylacrylamide) side segments,
poly[N-(2-hydroxyethyl) acrylamide] side segments,
poly(N,N-dimethylacrylamide) side segments, and
poly(N,N-diethylacrylamide) side segments.

4. The method as defined in claim 1, wherein said side segments are selected from the group consisting of
poly(N-isopropylacrylamide) side segments,
poly[N-(2-hydroxyethyl)acrylamide] side segments,
poly(N,N-dimethylacrylamide) side segments, and
poly(N,N-diethylacrylamide) side segments.

* * * * *